United States Patent [19]
Yamane

[11] Patent Number: 5,921,139
[45] Date of Patent: Jul. 13, 1999

[54] BICYCLE SHIFT CONTROL DEVICE

[75] Inventor: Takuro Yamane, Sakai, Japan

[73] Assignee: Shimano, Inc., Osaka, Japan

[21] Appl. No.: 08/854,520

[22] Filed: May 13, 1997

Related U.S. Application Data

[30] Foreign Application Priority Data

May 30, 1996 [JP] Japan .................................. 8-136518

[51] Int. Cl.$^6$ ........................... B62M 25/04; B62K 23/04
[52] U.S. Cl. ........................... 74/473.13; 74/143; 74/489; 74/505
[58] Field of Search ........................ 74/142, 143, 473.13, 74/473.14, 489, 505

[56] References Cited

U.S. PATENT DOCUMENTS

| | | | |
|---|---|---|---|
| 3,633,437 | 1/1972 | Ishida | 74/489 |
| 3,665,775 | 5/1972 | Freeman | 74/142 X |
| 3,874,248 | 4/1975 | Hauser et al. | 74/143 X |
| 4,900,291 | 2/1990 | Patterson | 474/80 |
| 5,197,927 | 3/1993 | Patterson | 474/80 |
| 5,481,934 | 1/1996 | Tagawa | 74/142 |
| 5,673,594 | 10/1997 | Huang et al. | 74/143 X |

*Primary Examiner*—Allan D. Hermann
*Attorney, Agent, or Firm*—James A Deland

[57] ABSTRACT

A bicycle shift control device includes a first member; a second member rotatably mounted relative to the first member for rotation in first and second directions; a third member rotatably mounted relative to the first member for controlling the pulling and releasing of a transmission control element; and a fourth member disposed between the second member and the third member. If desired, the first member may be structured to immovably fix the shifting device relative to the bicycle handlebar, and the fourth member may function as a takeup element for pulling and releasing a control cable. The fourth member rotates around the first axis integrally with the third member. The fourth member also moves in the direction of the first axis between an engagement position in which the fourth member engages the first member and a disengagement position in which the fourth member is disengaged from the first member. The second member includes a drive surface for driving the fourth member in a third direction (which may be the same as the first direction) when the second member rotates in the first direction. The fourth member includes first and second cam surfaces, wherein the first cam surface causes the fourth member to move in the direction of the first axis toward the disengagement position during rotation of the fourth member in the third direction, and wherein the second cam surface causes the fourth member to move in the direction of the first axis toward the disengagement position during rotation of the second member in the second direction. The fourth member also includes a positioning surface for preventing the fourth member from rotating around the first axis when the fourth member is in the engagement position.

20 Claims, 7 Drawing Sheets

BICYCLE SHIFT CONTROL DEVICE

BACKGROUND OF THE INVENTION

The present invention is directed to control devices for bicycles and, more particularly, to a twist-grip shifting device for shifting a bicycle transmission.

Twist-grip shifting devices that can rotate around their axes near handlebar ends and that extend in the longitudinal directions of the handlebar ends are used to manipulate takeup members in order to take up or pay out a shift control cable. After a takeup operation has been performed in such a manner, the takeup member must be positioned so that its location corresponds to the selected speed step. Known examples of positioning the takeup member include those merely involving the use of frictional resistance; those in which indentations are formed in the speed-step positions on the side of the fixed elements for engaging protrusions formed on the side of the control members (as described in Japanese Laid-Open Patent Application 3-176290); and those involving the provision of one-way ratchet mechanisms (as described in PCT/JP92/00138).

In twist-grip shifting devices where positioning is accomplished using frictional resistance or engagement between indentations and protrusions, considerable engagement force is needed to securely position the takeup member in the position corresponding to the selected speed step. This, in turn, results in a twist-grip shifting device in which considerable force is needed to implement the control operations. With twist-grip shifting devices in which positioning is accomplished using ratchet mechanisms, many components are required to construct the ratchet mechanisms, thus dramatically increasing the cost of the device.

SUMMARY OF THE INVENTION

The present invention is directed to a twist-grip shifting device that is economical to manufacture and which avoids the large forces required to operate prior art twist-grip shifting devices. In one embodiment of the present invention, a bicycle shift control device includes a first member; a second member rotatably mounted relative to the first member for rotation in first and second directions; a third member rotatably mounted relative to the first member for controlling the pulling and releasing of a transmission control element; and a fourth member disposed between the second member and the third member. If desired, the first member may be structured to immovably fix the shifting device relative to the bicycle handlebar, and the fourth member may function as a takeup element for pulling and releasing a control cable.

In any event, the fourth member rotates around the first axis integrally with the third member. The fourth member also moves in the direction of the first axis between an engagement position in which the fourth member engages the first member, and a disengagement position in which the fourth member is disengaged from the first member. The second member includes a drive surface for driving the fourth member in a third direction (which may be the same as the first direction) when the second member rotates in the first direction. The fourth member includes first and second cam surfaces, wherein the first cam surface causes the fourth member to move in the direction of the first axis toward the disengagement position during rotation of the fourth member in the third direction, and wherein the second cam surface causes the fourth member to move in the direction of the first axis toward the disengagement position during rotation of the second member in the second direction. The fourth member also includes a positioning surface for preventing the fourth member from rotating around the first axis when the fourth member is in the engagement position.

In a more specific embodiment, the drive surface contacts the fourth member when the second member rotates in the first direction, the first cam surface contacts the first member when the fourth member rotates in the third direction, the second cam surface contacts the second member when the second member rotates in the second direction. and the positioning surface contacts the first member when the fourth member is in the engagement position. The height of the drive surface in the direction of the first axis is greater than the corresponding height of the positioning surface, so the fourth member remains engaged with the second member when the fourth member disengages from the first member, thus allowing the fourth member to rotate in discrete steps. The resulting structure is constructed with few components, is very compact, and does not require large forces to operate the device.

DETAILED DESCRIPTION OF THE EMBODIMENTS

Figure 1:
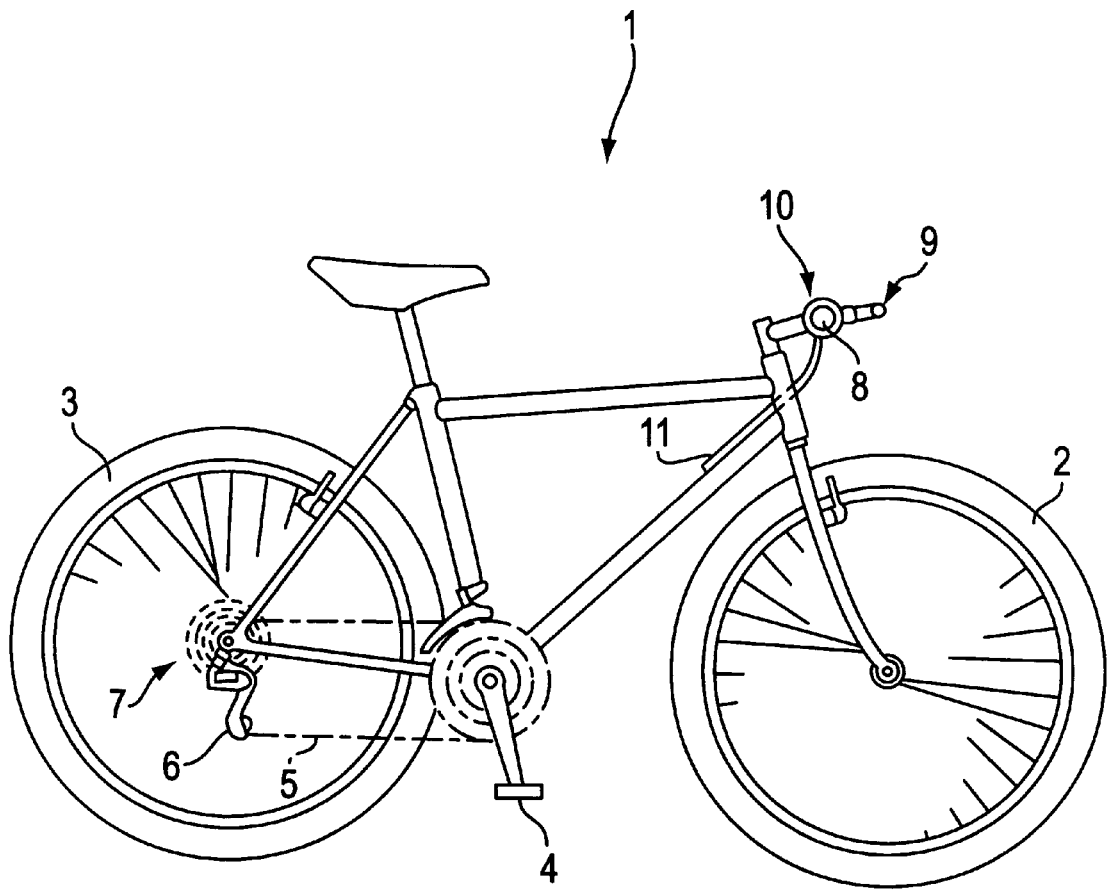
FIG. 1 is a side view of a bicycle which incorporates a particular embodiment of a bicycle shift control device according to the present invention.

FIG. 1 depicts a mountain bike 1 provided with the bicycle shift control device according to the present invention. This bicycle is equipped with a front wheel 2, pedals 4, a derailleur 6 for moving a chain 5 over a sprocket cassette 7 attached to a rear wheel 3, a brake mechanism 9, and the like. A twist-grip shift control device 10 that is attached to a handlebar 8 operates the derailleur 6 via a shifting cable 11. As used herein, the terms "front direction," "back direction," "transverse direction," and the like refer to the directions with respect to the bicycle. For example, "right" means to the right of the rider sitting on the saddle.

On a typical mountain bike, the handlebar 8 extends in the transverse direction of the bicycle 1, as shown in FIG. 1, but the device of the present invention pertains to a shift control device 10 installed on a tip of the handlebar 8 and is not limited by the shape of the handlebar itself. However, the tips of the handlebar 8 are shaped as long cylinders, so the longitudinal direction is accurately defined.

Figure 2:
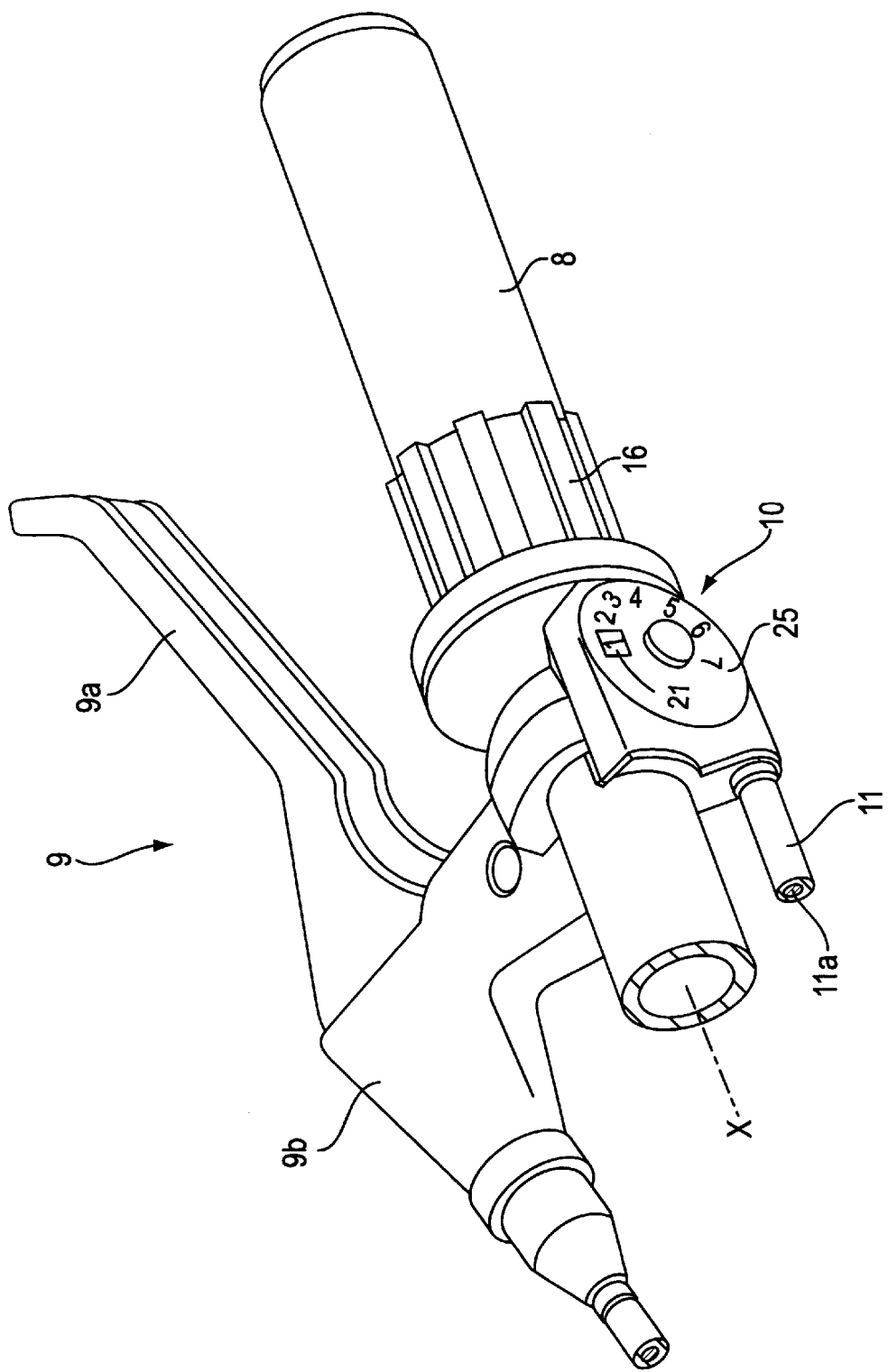
FIG. 2 is an oblique view of a particular embodiment of a shift control device according to the present invention.

As shown in FIG. 2, the derailleur 6 is operated as a result of the fact that the shifting cable 11 is pulled in or released by rotating an operating element 16, which is a shift operating element attached to the tip of the handlebar, around a first axis X that runs along the handlebar 8. Seven-step shifting can be accomplished with the shifting device of this embodiment.

Figure 3:
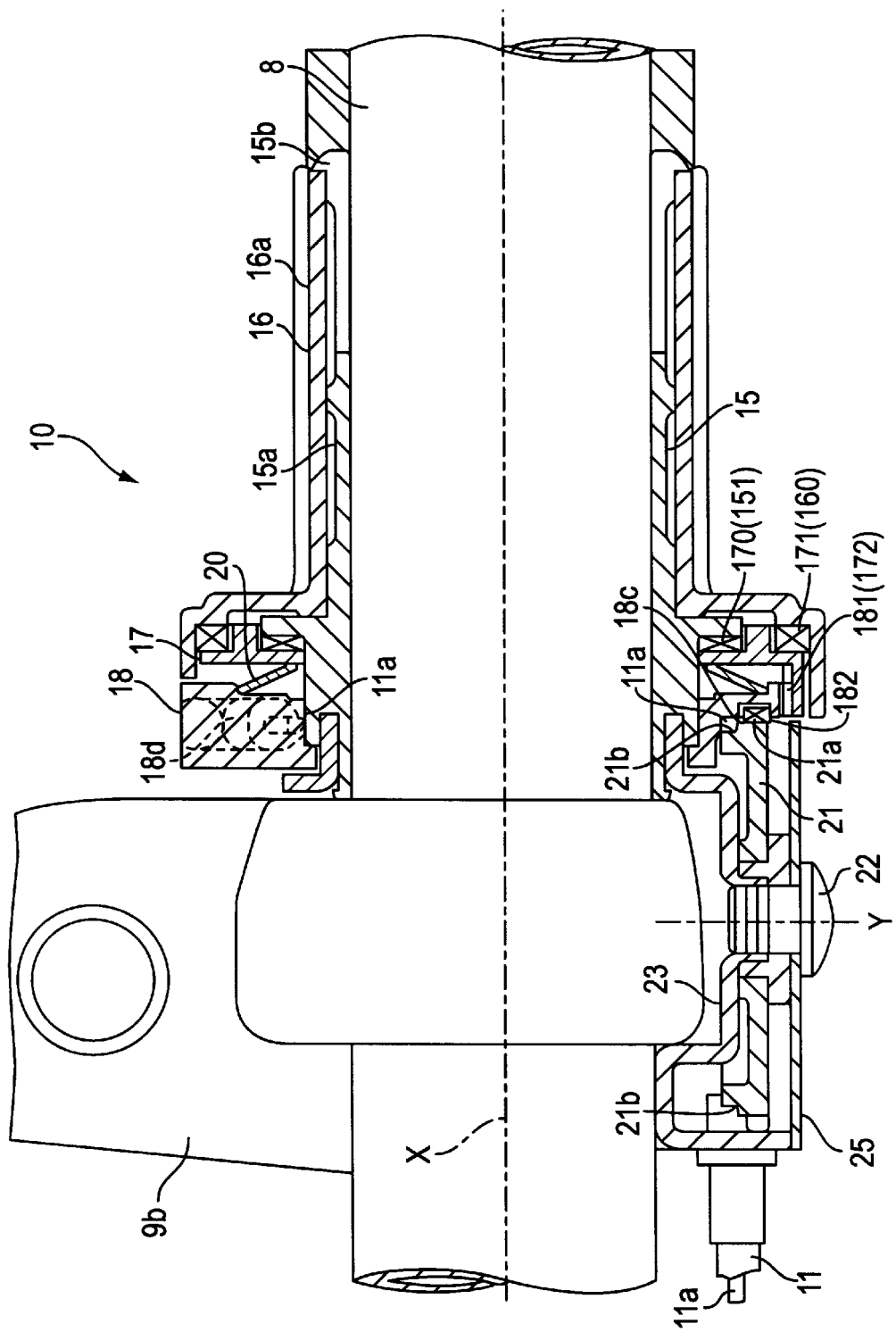
FIG. 3 is a cross sectional view of the shift control device shown in FIG. 2.

A takeup member 18 for taking up the shifting cable 11 can rotate around the first axis X, as shown in FIG. 3, and a deflection pulley 21 changes the extension direction of the cable 11 in such a way that the cable 11 is extended along the handlebar 8 outside the shift control device 10. This deflection pulley 21 is attached to a bracket member 9b that supports the brake arm 9a of the brake mechanism 9, and deflection pulley 21 can rotate around a second axis Y that is at a right angle to the first axis. Therefore, the portion that has been wound around the takeup member 18 of the shifting cable 11 is located in the plane perpendicular to the first axis X, whereas the portion located outside of the shift control device 10 extends along the first axis.

The structure of the shift control device 10 will now be described in detail. Although the description that follows refers to the shift control device 10 that is used to control the rear derailleur 6 and that is attached to the right-end portion of the bicycle handlebar 8, the same shift control device can be provided on the left end of the handlebar.

Shift control device 10 comprises a first member in the form of a fixed member 15 attached in such a way that it cannot rotate in relation to the handlebar; a second member in the form of a grip member 16 (shift operating element) capable of rotating around the first axis X on fixed member 15; a fourth member in the form of an intermediate element 17 (called "an idler") that meshes with both the fixed member 15 and the operating element 16, that can rotate around the first axis X, and that can move along the first axis; and a third member in the form of a takeup member 18 that remains in constant gear engagement with the intermediate element, and can thus rotate integrally with intermediate element 17.

Figure 4:
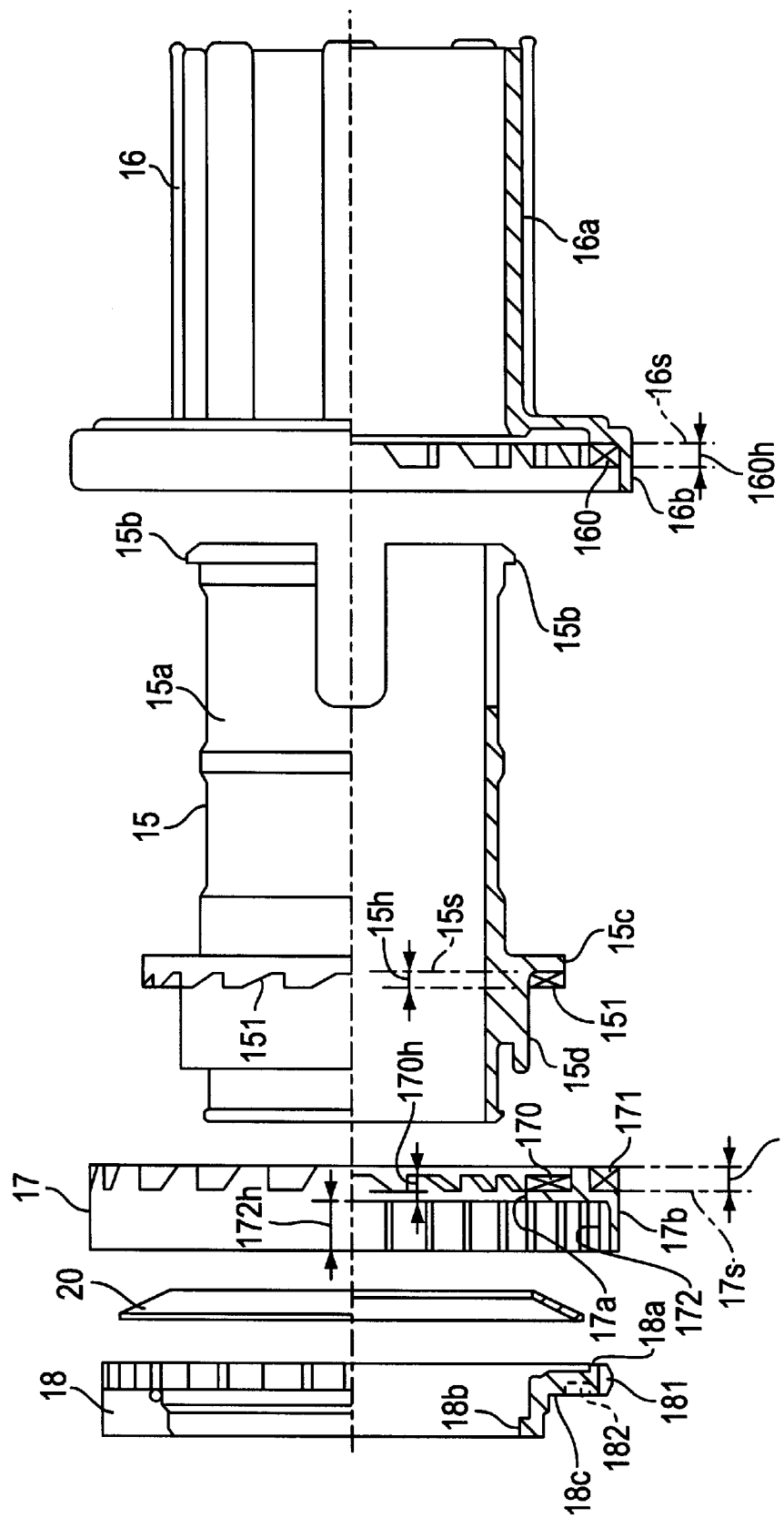
FIG. 4 is an exploded view of the shift control device shown in FIG. 2.

Each member of the shift control device 10 will now be described with reference to FIGS. 3 and 4. The fixed member 15 is preferably made of resin, and the entire member is shaped as a long cylinder that fits around the handlebar 8. A restraining projection 15b for restraining the movement of the operating element 16 to the right by pressing against the operating element 16 is provided to the right-end portion of a cylindrical barrel 15a. A large-diameter portion 15c is provided to the portion that presses against the intermediate element 17 and that is on the side opposite the restraining projection 15b, and a fixed-member gear portion 151 is provided in the plane 15s that faces the intermediate element 17 and that is perpendicular to the first axis X of the large-diameter portion 15c. The plane 15s that faces the intermediate element 17 and is perpendicular to the first axis X is referred to as "the reference plane 15s of the fixed member." The fixed-member gear portion 151 has a plurality of gear teeth that extend along the first axis away from the reference plane 15s of the fixed member 15. The height of the gear teeth in relation to the reference plane 15s is indicated as 15h. An intermediate-diameter cylindrical component 15d extends further away from the large-diameter portion 15c in the direction of the intermediate element 17, thus forming a surface for contacting and supporting the inside-diameter surface 17a of the intermediate element 17. The outside diameter of the intermediate-diameter cylindrical component 15d is greater than the outside diameter of the cylindrical barrel 15a but less than the outside diameter of the large-diameter portion 15c.

The operating element 16 (grip) is fitted on the fixed member 15 and is supported in such a way that it can rotate around the first axis but cannot move along the first axis in relation to the fixed member 15. Overall, the operating element 16 is shaped as a cylinder, and the portion that faces the intermediate element 17 has a large-diameter portion 16b whose outside diameter is greater than a barrel 16a. A gear portion 160 is provided in a reference plane 16s facing the intermediate element 17 of the large-diameter portion 16b. The gear portion 160 has a plurality of gear teeth that extend along the first axis away from the reference plane 16s of the operating element 16. The height of the gear teeth in relation to the reference plane 16s is indicated as 160h.

Overall, the intermediate element 17 has an annular shape, and the inside-diameter surface 17a thereof is slidably fitted on the intermediate-diameter cylindrical component 15d of the fixed member 15. The width of the intermediate element 17 in the direction of the first axis is less than the width of the intermediate-diameter cylindrical component 15d of the fixed member 15 in the direction of the first axis, and the intermediate element 17 can change its position in the direction of the first axis and to rotate around the first axis. The intermediate element 17 is spring-loaded in the direction of the operating element 16 with a leaf spring 20 positioned between the intermediate element 17 and the takeup member 18 shown in FIG. 3. The surface of the intermediate element 17 that faces the operating element 16 is equipped with the first gear portion 170 of the intermediate element that engages the gear portion 151 of the fixed member 15, and with the second gear portion 171 of the intermediate element that engages the gear portion 160 of the operating element 16. The first gear portion 170 is provided on the inside in relation to the second gear portion 171, as viewed in the radial direction (FIG. 4). Serrations 172 that engage the takeup member 18 are provided to the inner surface of a peripheral portion 17b on the side of the intermediate element 17 that faces the takeup member. These serrations 172 extent along the first axis, and the length thereof is indicated as 172h.

The first and second gear portions 170 and 171 have gear teeth that are perpendicular to the first axis and that extend along the first axis in the direction of the operating element 16 and away from a reference plane 17s facing the operating element 16. The tooth measurement 171h of the gear teeth of the second gear portion 171 of the intermediate element in engagement with the gear portion 160 of the operating element 16 is greater than the tooth measurement 170h of the gear teeth of the first gear portion of the intermediate element in engagement with the gear portion 151 of the fixed member 15.

Figure 5A:
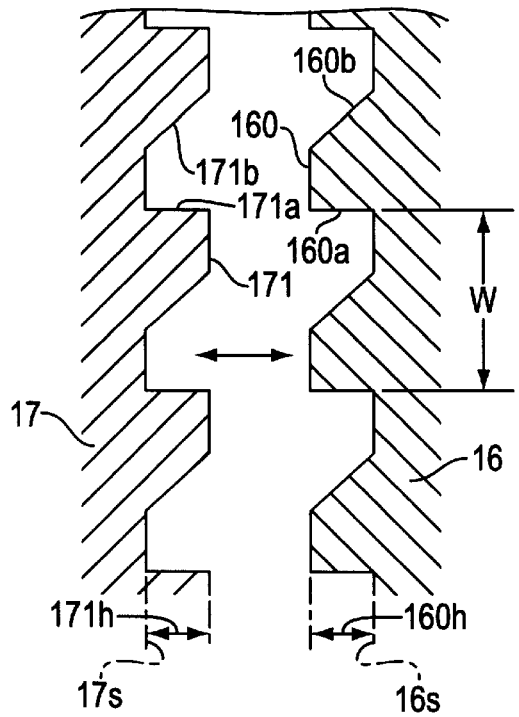
FIGS. 5A and 5B are cross sectional views depicting the shapes of the gear portions of the intermediate element, the fixed member, and the operating element.
Figure 5B:
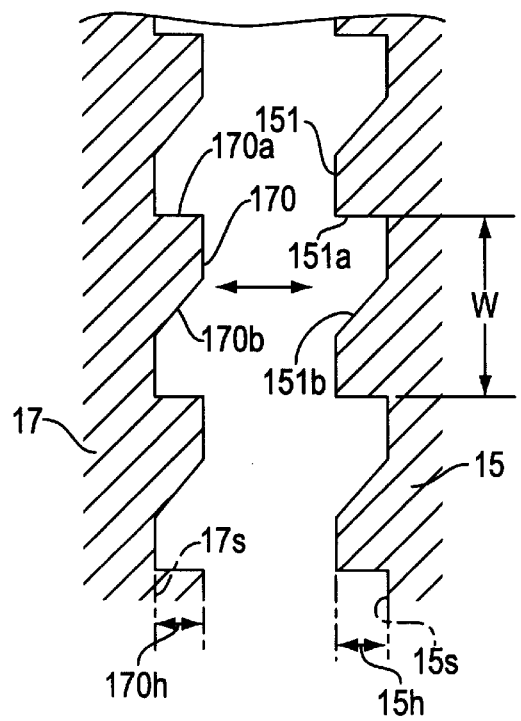

FIG. 5A schematically shows a cross section of the second gear portion 171 of the intermediate element that faces the gear portion 160 of the operating element 16, and FIG. 5B schematically shows a cross section of the first gear portion 170 of the intermediate element that faces the gear portion 151 of the fixed member 15. As shown in FIGS. 5A and 5B, the gear teeth of these gear portions have surfaces that extend in the direction running along the first axis X. The gear teeth also have surfaces that are inclined with respect to the first axis X. Specifically, the gear teeth of the first gear portion 170 of the intermediate element are provided with positioning surfaces 170a that extend in the direction running along the first axis X, and these surfaces come into contact with surfaces 151a that face the gear portion 151 of the fixed member 15. The gear teeth of the first gear portion 170 of the intermediate element are also provided with first cam surfaces 170b that are inclined to the first axis X, and these surfaces come into contact with the surfaces 151b of the fixed member. The gear teeth of the second gear portion 171 of the intermediate element are provided with surfaces 171a that extend along the first axis X, and with second cam surfaces 171b that are inclined to the first axis X. The gear teeth of the gear portion 160 of the operating element 16 that faces the second gear portion 171 of the intermediate element are provided with drive surfaces 160a extending along the first axis and with surfaces 160b corresponding to the second cam surfaces 171b for rotatably driving the intermediate element. The gear lengths W of the gear teeth of the fixed member, those of the gear teeth of the intermediate member, and those of the gear teeth of the operating element are set to a length equal to the displacement necessary for shifting the speed step by one step.

As is shown in FIG. 3, part of the innermost side of the takeup member is fitted on the fixed member 15, and the external peripheral portion is provided with teeth 181 for meshing with the serrations 172 of the intermediate element 17. The width of the teeth 181 in the direction of the first axis is less than the width of the serrations 172 of the intermediate element 17, and the gear engagement between the intermediate element 17 and the takeup member 18 holds even when the intermediate element 17 changes its position along the first axis.

The serrations 182 for meshing with the deflection pulley 21 (fifth member) are provided on the surface of the takeup member 18 that faces the deflection pulley 21 on the inside immediately below the external peripheral portion. A shoulder 18c is formed between the large-diameter portion 18a and the base 18b of the takeup member 18, and the inner wire 11a of the shifting cable 11 is taken up by this shoulder 18c. In FIG. 3, 18d is a coupler for connecting the tip of the inner wire 11a with the takeup member 18.

As shown in FIG. 3, deflection pulley 21 is held with the aid of a fixing screw 22 while allowed to rotate around the second axis in relation to the bracket 9b of the brake device. The second axis is at a right angle to the first axis. The portion of the inner wire 11a that is taken up by the takeup member 18 is in a plane perpendicular to the first axis, but the deflection pulley 21 allows the portion of the inner wire 11a that is outside of the shift control device to be extended in the longitudinal direction of the handlebar.

The deflection pulley 21 has an overall discoid shape, and the peripheral portion thereof is provided with engagement teeth 21a for engaging the serrations 182 of the takeup member. In addition, a shoulder 21b that extends in the direction of the second axis is formed on the inside immediately below the peripheral portion, and the inner wire 11a is in tangential contact with this shoulder 21b. Deflection pulley 21 also is provided with an indicator for indicating the speed step. In this indicator, numbers indicating speed steps are written on the side surface of the deflection pulley 21, and these numbers can be viewed through a window in the cover 25 provided to a fixed component, as shown in FIG. 2. The position of the window and the numbers that indicate the speed steps are adjusted to allow the numbers that correspond to the speed steps to be displayed.

The operation of the shift control device pertaining to the present invention will now be described with reference to FIGS. 6A–6D and 7A–7D. In particular, emphasis will be made on the clutch portion composed of the corresponding gear components of the operating element that belong to the intermediate element 17 and the fixed member 15. For the sake of simplicity, the shape of the gear teeth will be shown in simplified form in FIGS. 6A–6D and 7A–7D.

In FIGS. 6A–6D, the manner in which these components move when the operating element 16 is operated in the takeup direction is shown in the sequential order from FIGS. 6A to 6D. First, the drive surfaces 160a of the gear portion 160 of the operating element 16 press against the surfaces 171a of the second gear portion 171 of the intermediate element 17 and rotate the intermediate element 17 around the first axis X when the operating element 16 is rotated in the direction (shown by arrow D1 in FIG. 6A) corresponding to the takeup direction of the takeup member 18. When this occurs, the first gear portion 170 moves in relation to the fixed member 15 because the first gear portion 170 and the second gear portion 171 of the intermediate element 17 form an integral whole.

Figure 6A:
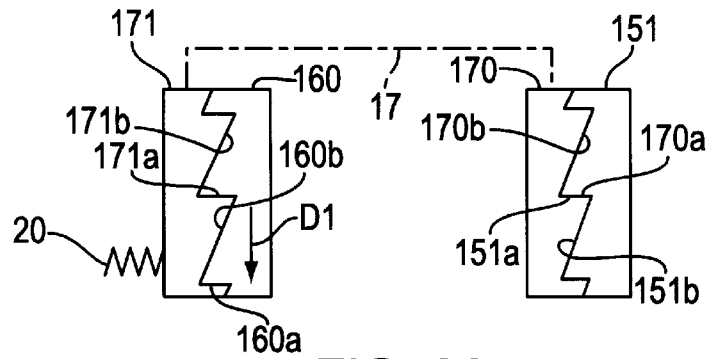
FIGS. 6A–6D are schematic views showing the operation of the twist-grip shifter when the operating element is rotated in a first direction.
Figure 6B:
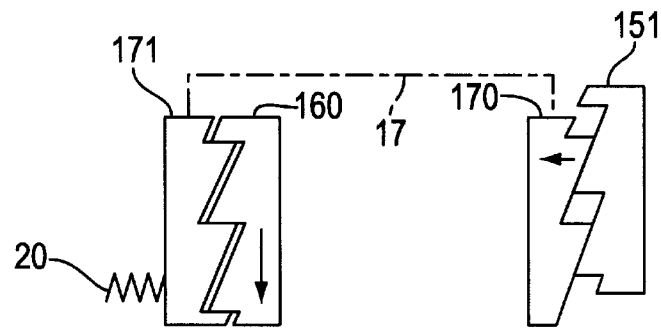
Figure 6C:
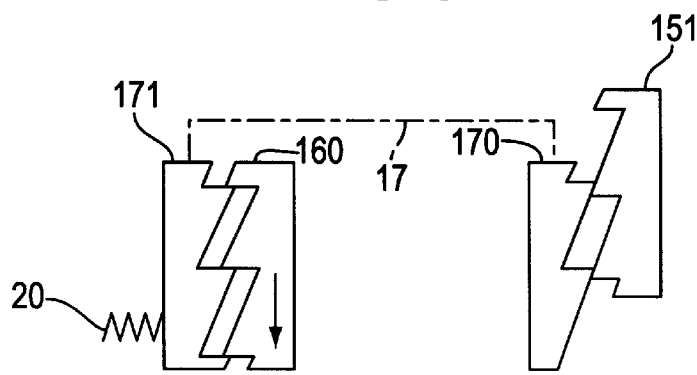
Figure 6D:
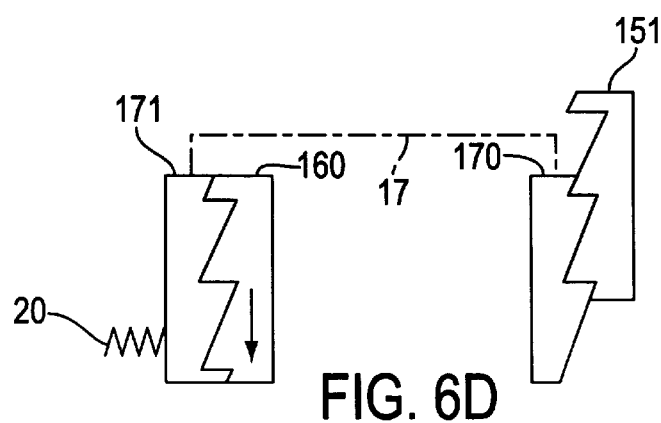

The first cam surfaces 170b of the first gear portion displace the intermediate element 17 in the direction of the first axis, as shown in FIGS. 6B and 6C. Further rotation of the operating element 16 in the takeup direction causes the gear teeth of the first gear portion of the intermediate element 17 to jump over the gear teeth of the fixed member 15, as shown in FIG. 6D, and the intermediate element 17 is again captured by the fixed member 15 in a position resulting from the shifting of the intermediate element by a single speed step w along the fixed member 15. Because the intermediate element 17 is in constant engagement with the takeup member 18, the takeup member 18 moves a single speed step w together with the intermediate element 17 in relation to the fixed member 15. At this time, the positioning surfaces 170a of the intermediate element 17 are pressed against the corresponding surfaces 151a of the fixed member 15, and the intermediate element 17 is held in place with respect to the fixed member 15.

Because in this case the tooth measurement 171h of the second gear portion 171 of the intermediate element is greater than the tooth measurement 170h of the gear teeth of the first gear portion 170 of the intermediate element in the engagement portion between the second gear portion 171 of the intermediate element and the gear portion 160 of the operating element 16, the gear teeth of the second gear portion 171 of the intermediate element do not move over the teeth of the gear portion 160 of the operating element 16 and remain captured by the same mating teeth even when the gear teeth of the first gear portion 170 of the intermediate element have moved over the gear teeth of the fixed member 15. Specifically, the position of the intermediate element 17 in relation to the operating element 16 remains the same as the position occupied before the operating element 16 has been manipulated.

The movement of the intermediate element 17 and the takeup member 18 in relation to the fixed member 15 during the rotation of the operating element 16 in the pay-out direction (opposite the takeup direction) will now be described with reference to FIGS. 7A–7D.

In FIGS. 7A–7D, the manner in which these components move when the operating element 16 is operated in the pay-out direction is shown in the sequential order from FIG. 7A to 7D. Rotating the operating element 16 in the reverse direction with respect to the aforementioned direction (indicated as D2 in FIG. 7A) causes the second cam surfaces 171b provided to the second gear portion of the intermediate element 17 to slide on the corresponding gear portion 160a of the operating element, displaces the operating element 16 in the direction indicated by D2, and moves the intermediate element 17 along the first axis and away from the operating element 16. Because in this case the positioning surfaces 170a of the intermediate element 17 are captured by the corresponding surfaces 151 a of the fixed member 15, the positioning surfaces 170a a merely slide on the corresponding surfaces 151a of the fixed member 15, with the result that the intermediate element 17 does not rotate around the first axis at this time.

Figure 7A:
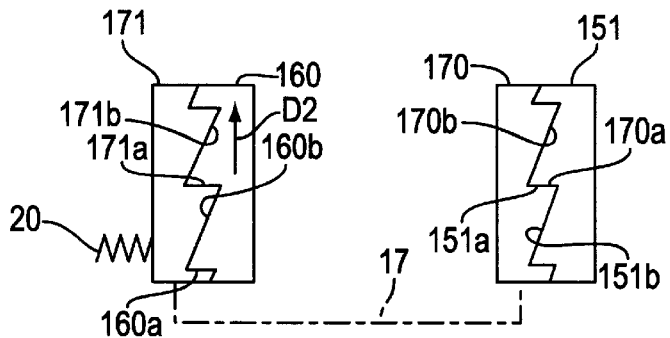
FIGS. 7A–7D are schematic views showing the operation of the twist-grip shifter when the operating element is rotated in a second direction.
Figure 7B:
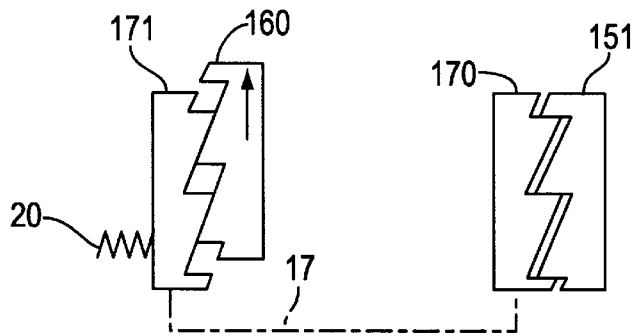
Figure 7C:
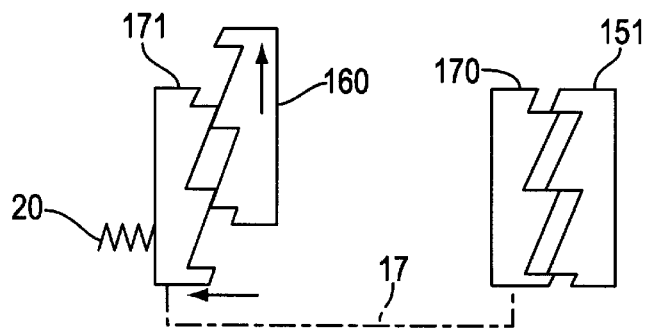
Figure 7D:
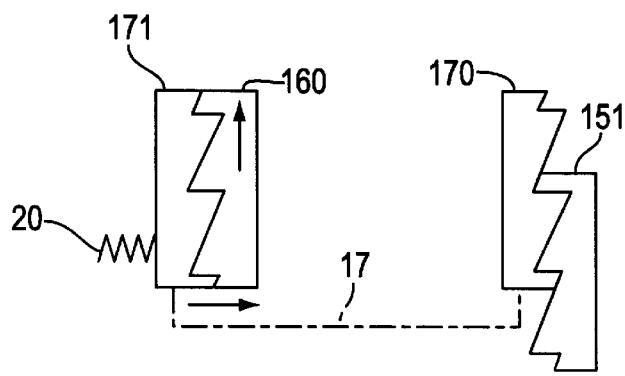

Further rotating the operating element 16 in the direction indicated as D2 causes the gear teeth of the first gear portion 170 of the intermediate element to move over the corresponding gear teeth of the fixed member 15 because the tooth measurement 170h of the gear teeth of the first gear portion 170 of the intermediate element is less than the tooth measurement 171h of the second gear portion 171 of the intermediate element, as shown in FIG. 7C. In the process, the intermediate element 17 moves one speed step (w) in the pay-out direction along the fixed member 15 because the intermediate element 17 is spring-loaded in the pay-out direction (indicated as D2) via the takeup member 18, as shown in FIG. 7D. In the process, the second gear portion 171 of the intermediate element first moves away from the gear portion 160 of the operating element 16 but then engages the same teeth again once the gear teeth of the first gear portion 170 of the intermediate element move over the gear teeth of the fixed member 15.

While the above is a description of one embodiment of the present invention, various modifications may be employed without departing from the spirit of the invention. Consequently, the scope of the invention should not be limited to the specific structures disclosed. Instead, the true scope of the invention should be determined by the following claims.

What is claimed is:

1. A bicycle shift control device comprising:
   a first member;
   a second member rotatably mounted relative to the first member, wherein the second member rotates in first and second directions;
   a third member rotatably mounted relative to the first member for controlling the pulling and releasing of a transmission control element;
   a fourth member disposed between the second member and the third member, wherein the fourth member rotates integrally with the third member, wherein the fourth member rotates around a first axis, and wherein the fourth member moves in the direction of the first axis between an engagement position in which the fourth member engages the first member and a disengagement position in which the fourth member is disengaged from the first member;
   wherein the second member includes a drive surface for driving the fourth member in a third direction when the second member rotates in the first direction;
   wherein the fourth member includes a first cam surface for causing movement of the fourth member in the direction of the first axis toward the disengagement position during rotation of the fourth member in the third direction; and
   wherein the fourth member includes a positioning surface for preventing the fourth member from rotating around the first axis when the fourth member is in the engagement position.

2. The device according to claim 1 wherein the third direction is the same as the first direction.

3. The device according to claim 1 wherein the drive surface contacts the fourth member when the second member rotates in the first direction.

4. The device according to claim 1 wherein the first cam surface contacts the first member when the fourth member rotates in the third direction.

5. The device according to claim 1 wherein the positioning surface contacts the first member when the fourth member is in the engagement position.

6. The device according to claim 1 wherein the fourth member includes a second cam surface for causing movement of the fourth member in the direction of the first axis toward the disengagement position during rotation of the second member in the second direction.

7. The device according to claim 6 wherein the second cam surface contacts the second member when the second member rotates in the second direction.

8. The device according to claim 6 wherein there is a plurality of the first cam surfaces, wherein there is a plurality of the second cam surfaces, and wherein the plurality of first cam surfaces and the plurality of second cam surfaces are disposed in a common plane.

9. The device according to claim 8 wherein the plane is oriented substantially perpendicular to the first axis.

10. The device according to claim 9 wherein the plurality of first cam surfaces are formed as a first circular arc, wherein the plurality of second cam surfaces are formed as a second circular arc, and wherein the first circular arc is radially displaced from the second circular arc relative to the first axis.

11. The device according to claim 1 wherein the drive surface and the positioning surface both extend in the direction of the first axis.

12. The device according to claim 1 wherein a height of the drive surface in the direction of the first axis is greater than a height of the positioning surface in the direction of the first axis.

13. The device according to claim 1 further comprising a fifth member coupled to the fourth member, wherein the fifth member rotates around a second axis that is substantially perpendicular to the first axis.

14. The device according to claim 1 wherein the third direction is the same as the first direction, wherein the drive surface contacts the fourth member when the second member rotates in the first direction, wherein the first cam surface contacts the first member when the fourth member rotates in the third direction, and wherein the positioning surface contacts the first member when the fourth member is in the engagement position.

15. The device according to claim 14 wherein the fourth member includes a second cam surface for causing movement of the fourth member in the direction of the first axis toward the disengagement position during rotation of the second member in the second direction, and wherein the second cam surface contacts the second member when the second member rotates in the second direction.

16. The device according to claim 15 wherein there is a plurality of the first cam surfaces, wherein there is a plurality of the second cam surfaces, and wherein the plurality of first cam surfaces and the plurality of second cam surfaces are disposed in a common plane.

17. The device according to claim 16 wherein the plane is oriented substantially perpendicular to the first axis.

18. The device according to claim 17 wherein there is a plurality of the drive surfaces, wherein there is a plurality of the positioning surfaces, and wherein the plurality of drive surfaces and the plurality of positioning surfaces are disposed in the plane when the fourth member is in the engagement position.

19. The device according to claim 18 wherein the plurality of drive surfaces and the plurality of positioning surfaces both extend in the direction of the first axis.

20. The device according to claim 19 wherein a height of the plurality of drive surfaces in the direction of the first axis is greater than a height of the plurality of positioning surfaces in the direction of the first axis.

* * * * *